United States Patent
Grau Sorarrain et al.

(10) Patent No.: US 10,199,903 B2
(45) Date of Patent: Feb. 5, 2019

(54) DEVICE FOR DEFLECTING AT LEAST A PORTION OF A COOLING FLUID LOWING AXIALLY IN AN INTERMEDIATE SPACE WHICH IS ARRANGED BETWEEN A ROTOR AND A STATOR OF A ROTATING ELECTRICAL MACHINE

(71) Applicant: Siemens Aktiengesellschaft, Munich (DE)

(72) Inventors: Esteban Grau Sorarrain, Dusseldorf (DE); Christian Jäkel, Duisburg (DE); Mario Koebe, Mulheim an der Ruhr (DE); Matthias Kowalski, Mulheim an der Ruhr (DE); Christoph Lehmann, Neukirchen-Vluyn (DE); Andrey Mashkin, Cologne (DE); Olga Plotnikova, Wuppertal (DE); Carolin Schild, Mulheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 247 days.

(21) Appl. No.: 15/027,572

(22) PCT Filed: Sep. 11, 2014

(86) PCT No.: PCT/EP2014/069360
§ 371 (c)(1),
(2) Date: Apr. 6, 2016

(87) PCT Pub. No.: WO2015/055355
PCT Pub. Date: Apr. 23, 2015

(65) Prior Publication Data
US 2016/0241111 A1    Aug. 18, 2016

(30) Foreign Application Priority Data
Oct. 14, 2013    (EP) .................................... 13188456

(51) Int. Cl.
*H02K 9/00* (2006.01)
*H02K 9/06* (2006.01)
(Continued)

(52) U.S. Cl.
CPC ................. *H02K 9/00* (2013.01); *H02K 9/06* (2013.01); *H02K 9/08* (2013.01); *H02K 9/10* (2013.01); *H02K 1/32* (2013.01); *H02K 7/1823* (2013.01)

(58) Field of Classification Search
CPC .. H02K 9/06; H02K 9/00; H02K 9/08; H02K 9/10; H02K 1/32; H02K 7/1823;
(Continued)

(56) References Cited

U.S. PATENT DOCUMENTS 926,086 A * 6/1909 Behrend .................. H02K 9/06
                                                          310/59
958,612 A * 5/1910 Eyermann ........... F04D 29/2266
                                                          277/420
(Continued)

FOREIGN PATENT DOCUMENTS

| CN | 1638240 A | 7/2005 |
| CN | 1784818 A | 6/2006 |

(Continued)

OTHER PUBLICATIONS

English Machine Translation of Taniyama et al., JP 2006074866 A, Mar. 16, 2006.*
(Continued)

*Primary Examiner* — Burton Mullins
(74) *Attorney, Agent, or Firm* — Beusse Wolter Sanks & Maire

(57) ABSTRACT

A device for deflecting at least a portion of a cooling fluid flowing axially in an intermediate space is arranged between a rotor and a stator of a rotating electrical machine, in
(Continued)

particular of a turbogenerator, wherein at least one blade can be arranged on a prespecifiable section of an outer face of the rotor and in the intermediate space, which blade is designed and can be arranged in such a way that a portion of the cooling fluid flowing in the intermediate space can be radially deflected in the direction of the stator by said blade.

11 Claims, 2 Drawing Sheets

(51) Int. Cl.
    *H02K 9/08*    (2006.01)
    *H02K 9/10*    (2006.01)
    *H02K 7/18*    (2006.01)
    *H02K 1/32*    (2006.01)

(58) Field of Classification Search
CPC ........ F04D 17/16; F04D 29/28; F04D 29/281; F04D 29/582; F04D 29/584; F04D 29/5846
USPC ........ 310/55, 58, 60 A, 60 R, 261, 1, 261.1; 415/106; 416/181
See application file for complete search history.

(56) References Cited

U.S. PATENT DOCUMENTS

| | | | | |
|---|---|---|---|---|
| 981,763 | A * | 1/1911 | Huelsenberg | F04D 29/2266 |
| | | | | 415/106 |
| 996,859 | A * | 7/1911 | Keller | F04D 29/30 |
| | | | | 415/104 |
| 3,348,081 | A * | 10/1967 | Willyoung | H02K 9/18 |
| | | | | 310/55 |
| 3,413,499 | A | 11/1968 | Barton | |
| 3,874,812 | A * | 4/1975 | Hanagarth | F04D 1/06 |
| | | | | 415/106 |
| 4,086,020 | A * | 4/1978 | Tanabe | F03B 11/066 |
| | | | | 415/106 |
| 4,264,834 | A * | 4/1981 | Armor | H02K 9/10 |
| | | | | 310/55 |
| 4,584,496 | A | 4/1986 | Frister | |
| 4,890,980 | A * | 1/1990 | Heald | F04D 29/2266 |
| | | | | 416/181 |
| 5,086,246 | A | 2/1992 | Dymond et al. | |
| 6,943,469 | B2 * | 9/2005 | Nelson | H02K 9/04 |
| | | | | 310/52 |
| 7,247,958 | B2 * | 7/2007 | Iwashige | H02K 9/10 |
| | | | | 310/58 |
| 2007/0024129 | A1 | 2/2007 | Pfannschmidt et al. | |
| 2010/0231066 | A1 | 9/2010 | Koerner | |
| 2014/0333163 | A1* | 11/2014 | Horii | H02K 1/20 |
| | | | | 310/59 |

FOREIGN PATENT DOCUMENTS

| | | |
|---|---|---|
| CN | 101263642 A | 9/2008 |
| DE | 1613111 A1 | 9/1970 |
| DE | 3410760 A1 | 9/1985 |
| EP | 1734641 A2 | 12/2006 |
| GB | 2470107 A | 11/2010 |
| JP | S5521539 A | 2/1980 |
| JP | 2003319612 A | 11/2003 |
| JP | 2005185025 A | 7/2005 |
| JP | 2006074866 A | 3/2006 |
| JP | 2010104202 A | 5/2010 |

OTHER PUBLICATIONS

English Machine Translation of Iritani et al., JP 2003319612 A, Nov. 7, 2003.*
JP Office Action dated May 29, 2017, for JP patent application No. 2016522790.
CN Office Action dated Aug. 31, 2017, for CN patent application No. 201480056624.3.

* cited by examiner

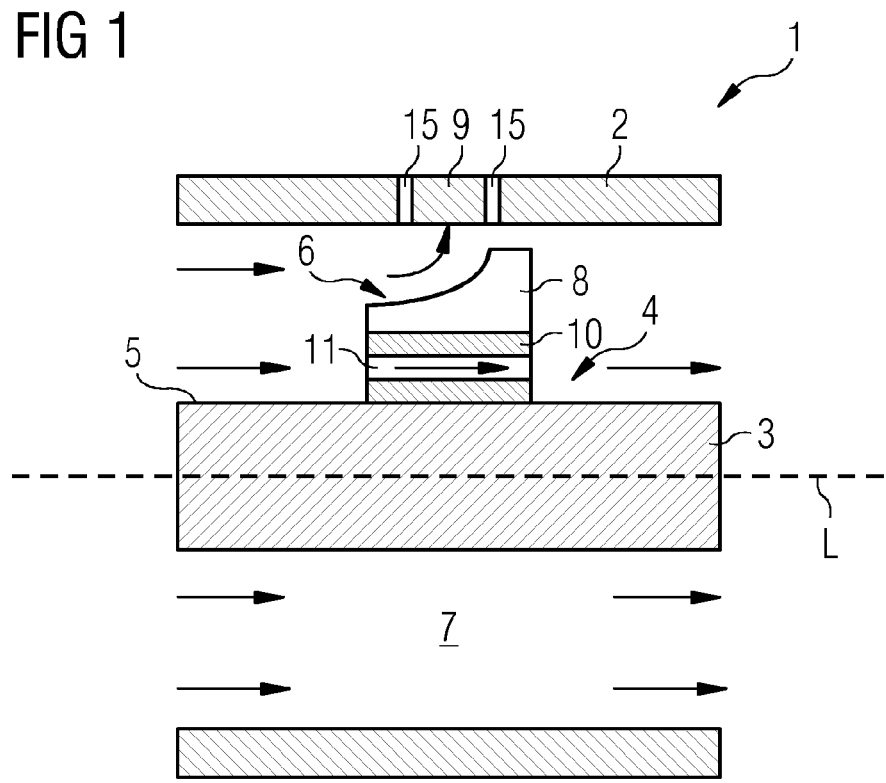

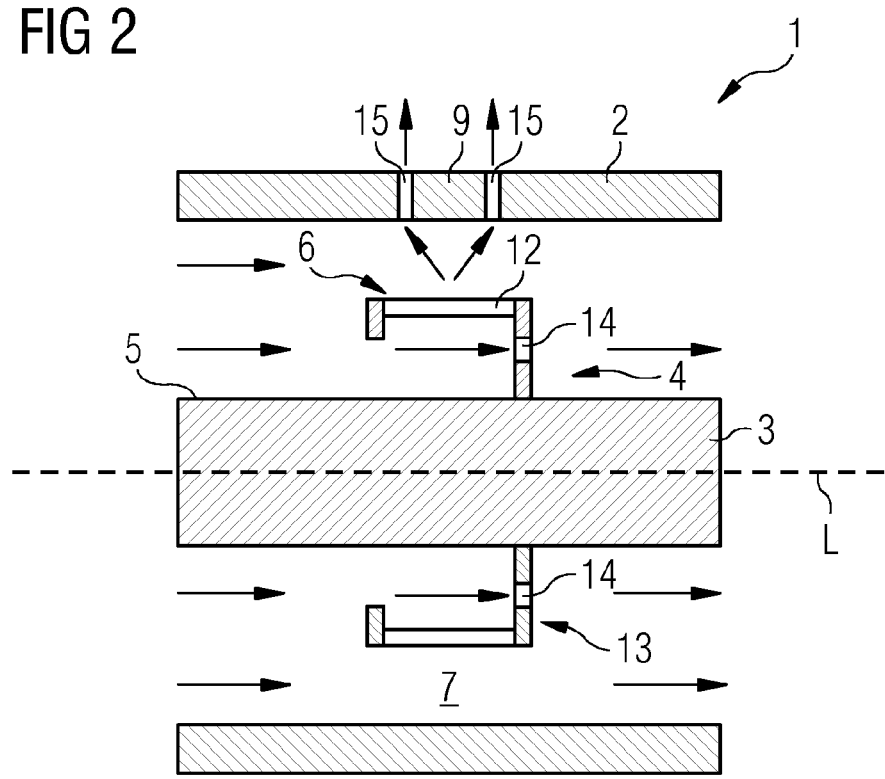

DEVICE FOR DEFLECTING AT LEAST A PORTION OF A COOLING FLUID LOWING AXIALLY IN AN INTERMEDIATE SPACE WHICH IS ARRANGED BETWEEN A ROTOR AND A STATOR OF A ROTATING ELECTRICAL MACHINE

CROSS REFERENCE TO RELATED APPLICATIONS

This application is the US National Stage of International Application No. PCT/EP2014/069360 filed Sep. 11, 2014, and claims the benefit thereof. The International Application claims the benefit of European Application No. EP13188456 filed Oct. 14, 2013. All of the applications are incorporated by reference herein in their entirety.

FIELD OF INVENTION

The invention relates to a device for deflecting at least a portion of a cooling fluid that is flowing axially in an intermediate space, which is arranged between a rotor and a stator of a rotating electrical machine, in particular a turbogenerator.

Furthermore, the invention relates to a rotor unit that comprises a rotor for a rotating electrical machine, in particular for a turbogenerator, and also a rotating electrical machine, in particular a turbogenerator, having a stator and a rotor.

In addition, the invention relates to a method for cooling a rotating electrical machine, in particular a turbogenerator, having a rotor and a stator, wherein a cooling fluid is introduced into an intermediate space that extends axially between the rotor and the stator.

BACKGROUND OF INVENTION

Rotating electrical machines in the form of turbogenerators are used in power stations for generating electrical energy. For this purpose, a turbogenerator is mechanically coupled to at least one gas turbine and/or a steam turbine, wherein the turbogenerator together with the gas turbine forms a turbo set.

During the operation of a rotating electrical machine, heat is unavoidably generated in the stator and/or the rotor of the rotating electrical machine. This heat loss occurs as a result of converting mechanical energy into electrical energy by means of the rotating electrical machine.

In order to achieve a reliable operation of the rotating electrical machine, it is necessary to dissipate the heat that is generated in a stator and/or rotor of a rotating electrical machine out of the rotating electrical machine. This is in particular necessary owing to the fact that electrical insulation is present on the stator and/or on the rotor and said insulation becomes impaired after achieving a specific temperature, which could lead to damaging electrical short circuits. The more heat that is dissipated out of a rotating electrical machine, the more the capacity of the rotating electrical machine can be used, which accompanies a corresponding increase in power.

Conventionally, a cooling fluid in the form of surrounding air, water, hydrogen and/or a mixture that contains hydrogen is used to dissipate heat from a rotating electrical machine or to cool the stator and/or the rotor of the rotating electrical machine. The cooling fluid is introduced axially between the stator and the rotor at the two axial ends of the rotating electrical machine and is mostly dissipated in the center of the rotating electrical machine radially out of the rotating electrical machine.

Heat is typically not generated in a stator and/or a rotor of a rotating electrical machine in a uniform manner. That is to say that there are regions of the rotating electrical machine in which more heat is generated than in other regions of the rotating electrical machine. The regions in which more heat is generated and/or that are not sufficiently cooled are also described as "hot spots". In hot spots of this type, it is possible by means of the heat that is generated as a result of the operation for impermissible and damaging overheating to occur more rapidly than in regions of a rotating electrical machine that are influenced by less heat. As a consequence, a conventional rotating electrical machine can only be used to its capacity if the materials that are arranged in the hot spots render possible a reliable operation of the rotating electrical machine.

It is also disadvantageous in the case of the conventional use of a cooling fluid, by way of example in the form of surrounding air, so as to dissipate heat, that when reaching a hot spot, the surrounding air has already absorbed so much heat that originates from other regions of a rotating electrical machine that a sufficient cooling arrangement of a hot spot is no longer possible. Consequently, it is possible by means of conventional heat dissipation, in particular using surrounding air, to ensure a more reliable operation of a rotating electrical machine in a more reliable permanent manner only up to a capacity upper limit that is dependent upon the heat load that is present in the hot spots.

SUMMARY OF INVENTION

An object of the invention is to increase the capacity of a rotating electrical machine, in particular a turbogenerator, and to render possible a reliable operation of the rotating electrical machine.

The device in accordance with the invention for deflecting at least a portion of a cooling fluid that is flowing axially in an intermediate space, which is arranged between a rotor and a stator of a rotating electrical machine, in particular a turbogenerator, comprises at least one blade that can be arranged on a predetermined section of an outer face of the rotor and in the intermediate space, said blade being embodied and being able to be arranged in such a manner that a part of the cooling fluid that is flowing in the intermediate space can be deflected radially towards the stator.

The device comprises at least one connecting element by way of which the blade can be connected to the rotor, wherein at least one outlet opening that extends parallel to the longitudinal axis of the rotor is arranged on the connecting element in such a manner that it is possible for a portion of the cooling fluid that makes contact with the connecting element to flow axially through said outlet opening. The device can also comprise two or more connecting elements as required, the number of which advantageously corresponds to the number of blades of the device. A connecting element can also comprise two or more outlet openings that are arranged parallel to the longitudinal axis of the rotor. An outlet opening advantageously comprises a cross section that is optimized for the flow of a portion of the cooling fluid.

A portion of the cooling fluid that is arranged axially in the intermediate space between the rotor and the stator is accelerated radially outwards towards the stator. As a consequence, it is possible for more heat to be dissipated from a section of the stator, said section being influenced by the portion of the cooling fluid that is deflected, and consequently this section can be better cooled by means of convection. It is advantageous that a hot spot that is arranged on the stator is cooled by means of the blade.

The improved cooling of the stator and consequently the rotating electrical machine renders it possible to increase the capacity of a rotating electrical machine and to operate the rotating electrical machine in a reliable manner. The device in accordance with the invention can be present in the case of a newly produced rotating electrical machine. A previously existing rotating electrical machine can also be retrofitted with a device in accordance with the invention.

If required, the device in accordance with the invention can also comprise two or more blades that can be arranged over the axial extent of the rotor and/or over the periphery of the rotor in the form of blade rows.

It is advantageous that the blade is embodied as a radial blade and a portion of the cooling fluid that is flowing in the intermediate space makes contact with said blade. Radial blades are known and can be arranged in a suitable form and number relative to one another on the rotor.

It is advantageous that the blades and the connecting element are connected to one another so as to form an individual component. This makes it possible to handle the blades and the connecting element in a simple manner and also to arrange the blade and the connecting element on the rotor in a simple manner. The blade can be connected in particular in an integrally bonded manner to the connecting element so as to form the individual unit.

The device advantageously comprises two or more blades that can be arranged on the predetermined section of the rotor distributed over the periphery of the rotor. It is possible by way of the number of blades that can be arranged on a predetermined section of the rotor and also the design of said blades to vary the size of the portion of the cooling fluid that is deflected by the blades radially towards the stator in order to bring about an optimal cooling result.

It is advantageous that the blade is a blade of a drum impeller radial blower that is connected to the rotor. Drum impeller radial blowers are known and during a rotation about their longitudinal axis generate a radial fluid flow with which it is possible to cool at least one hot spot on the stator. It is advantageous if each blade of the drum impeller radial blower is a blade within the meaning of the invention.

It is advantageous that at least one outlet opening that extends parallel to the longitudinal axis of the rotor is arranged on the drum impeller radial blower in such a manner that it is possible for a portion of the cooling fluid that makes contact with the drum impeller radial blower to flow axially through said outlet opening. Two or more outlet openings that are arranged parallel to the longitudinal axis of the rotor can also be arranged on the drum impeller radial blower. An outlet opening advantageously comprises a cross section that is optimized for a portion of the cooling fluid to flow through said outlet opening.

The rotor unit in accordance with the invention for a rotating electrical machine, in particular a turbogenerator, comprises a rotor and a device that is arranged on at least one predetermined section of an outer face of the rotor in accordance with one of the above mentioned embodiments or an arbitrary combination of the same. The advantages mentioned above in relation to the device are accordingly associated with this rotor unit that can be used to embody a rotating electrical machine, in particular a turbogenerator.

The rotating electrical machine, in particular the turbogenerator, comprises a stator, a rotor and at least one device in accordance with one of the above mentioned embodiments of the device or an arbitrary combination of the same.

The advantages mentioned above in relation to the device are accordingly associated with this rotating electrical machine that can accordingly comprise an above mentioned rotor unit. In particular, the rotating electrical machine in accordance with the invention can be reliably operated at a high capacity.

According to the method in accordance with the invention for cooling a rotating electrical machine, in particular a turbogenerator, having a rotor and a stator, a portion of a cooling fluid that is introduced into an intermediate space that extends axially between the rotor and the stator is deflected at at least one predetermined section of the rotating electrical machine radially towards the stator. The advantages mentioned above in relation to the device are accordingly associated with this method.

The portion of the cooling fluid that is introduced into the intermediate space is advantageously deflected radially towards the stator by means of at least one blade that is arranged in the predetermined section of the rotating electrical machine on an outer face of the rotor and in the intermediate space. It is advantageous that two or more blades, by way of example in the form of blade rows, are arranged on the outer face of the rotor. The arrangement of blades on the outer face of the rotor represents a constructively simple and cost-effective possibility for achieving the method. The blade can be embodied as a radial blade or as a blade of a drum impeller radial blower.

BRIEF DESCRIPTION OF THE DRAWINGS

Embodiments of the rotating electrical machine in accordance with the invention are explained hereinunder with reference to the attached schematic drawings. In the drawings:

FIG. 1 illustrates a cross section of a longitudinal section through an exemplary embodiment for a rotating electrical machine in accordance with the invention, and FIG. 2 illustrates a cross section of a longitudinal section through a further exemplary embodiment for a rotating electrical machine in accordance with the invention.

DETAILED DESCRIPTION OF INVENTION

FIG. 1 illustrates an exemplary embodiment of a rotating electrical machine 1 in accordance with the invention in the form of a turbogenerator having a stator 2 and a rotor 3. The rotor 3 is a part of a rotor unit 4 that also comprises a device 6 that is arranged on a predetermined section of an outer face 5 of the rotor 3, said device being arranged so as to deflect at least a portion of a cooling fluid that is flowing axially in an intermediate space 7, which is arranged between the rotor 3 and the stator 2. The flow of the cooling fluid is indicated by means of the arrow.

The device 6 comprises multiple blades 8 in the form of radial blades that are arranged on a predetermined section of an outer face 5 of the rotor 3 in the intermediate space 7 and distributed over the periphery of the rotor 3, only one of said blades 8 is visible in FIG. 1. The blades 8 are embodied and arranged in such a manner that a portion of the cooling fluid that makes contact with the blade 8 is deflected towards the stator 2 by means of said blades. The deflected portion of the cooling fluid that makes contact with the blades 8 is deflected towards a hot spot 9 that is arranged on the stator 2. Cooling openings 15 are arranged in the region of the hot spot 9 on the stator 2 and the deflected portion of the cooling fluid can flow through said cooling openings 15 so as to cool the hot spot 9.

The device 6 furthermore comprises multiple connecting elements 10 by way of which the blades 8 are connected to the rotor 3, wherein in FIG. 1 only one connecting element 10 is illustrated. One outlet opening 11 that extends parallel to the longitudinal axis L of the rotor 3 is arranged on the connecting element 10 in such a manner that a portion of the cooling fluid that makes contact with the connecting element 10 can flow axially through said outlet opening. The blade 8 and the connecting element 10 are connected to one another so as to form an individual component.

FIG. 2 illustrates a further exemplary embodiment of a rotating electrical machine 1 in accordance with the invention in the form of a turbogenerator having a stator 2 and a rotor 3. The rotor 3 is a part of a rotor unit 4 that also comprises a device 6 that is arranged on a predetermined section of an outer face 5 of the rotor 3, said device being arranged so as to deflect at least a portion of a cooling fluid that is flowing axially in an intermediate space 7, which is arranged between the rotor 3 and the stator 2. The flow of the cooling fluid is indicated by means of the arrow.

The device 6 comprises multiple blades 12 that are arranged on a predetermined section of an outer face 5 of the rotor 3 in the intermediate space 7 and distributed over the periphery of the rotor 3, only one of said blades 12 being visible in FIG. 2, and said blades are formed by means of blades of a drum impeller radial blower 13 that is connected to the rotor 3. The blades 12 are embodied and arranged in such a manner that a portion of the cooling fluid that is flowing in the intermediate space 7 and that makes contact with the blades 12 is deflected by said blades radially towards the stator 2. The deflected portion of the cooling fluid that makes contact with the blade 12 is deflected towards a hot spot 9 that is arranged on the stator 2.

Cooling openings 15 are arranged in the region of the hot spot 9 on the stator 2 and the deflected portion of the cooling fluid for cooling the hot spot 9 can flow through said cooling openings 15.

Multiple outlet openings 14 that extend parallel to the longitudinal axis L of the rotor 3 are arranged on the drum impeller radial blower 13 in such a manner that a portion of the cooling fluid that is flowing in the intermediate space 7 can flow axially through said outlet openings.

Although the invention has been further illustrated and described in detail by means of the preferred exemplary embodiments, the invention is not thus limited by means of the disclosed examples and other variations can be derived therefrom by a person skilled in the art without departing from the protective scope of the invention.

The invention claimed is:

1. A device for deflecting at least a portion of a cooling fluid that is flowing axially in an intermediate space that is arranged between a rotor and a stator of a rotating electrical machine, comprising:
    at least one blade arranged on a predetermined section of an outer face of the rotor and in the intermediate space, said at least one blade arranged in such a manner that a portion of the cooling fluid that is flowing in the intermediate space and into the at least one blade is deflected to flow radially outwardly towards the stator via said at least one blade,
    at least one connecting element connecting the at least one blade to the rotor, and
    at least one outlet opening that extends parallel to a longitudinal axis of the rotor arranged on the at least one connecting element such that a portion of the cooling fluid that makes contact with the at least one connecting element can flow axially through said at least one outlet opening.

2. The device as claimed in claim 1,
    wherein the at least one blade is embodied as a radial blade, and
    wherein a portion of the cooling fluid that is flowing in the intermediate space makes contact with said radial blade.

3. The device as claimed in claim 2, comprising
    two or more blades of the at least one blade arranged on the predetermined section of the rotor distributed over a periphery of the rotor.

4. The device as claimed in claim 1,
    wherein the at least one blade and the at least one connecting element are connected to one another so as to form an individual unit.

5. The device as claimed in claim 1,
    wherein the at least one blade is a blade of a drum impeller radial blower that is connected to the rotor.

6. The device as claimed in claim 5,
    wherein the at least one outlet opening that extends parallel to the longitudinal axis of the rotor is arranged on the drum impeller radial blower such that a portion of the cooling fluid that is flowing in the intermediate space can flow axially through said at least one outlet opening.

7. The device as claimed in claim 1,
    wherein the rotating electrical machine comprises a turbogenerator.

8. The device as claimed in claim 1, wherein the stator further comprises a cooling opening therethrough and disposed to receive cooling fluid redirected by the at least one blade.

9. A method for cooling a rotating electrical machine, said rotating electrical machine comprising a rotor and a stator, the method comprising:
    introducing a cooling fluid into an intermediate space that extends axially between the rotor and the stator,
    rotating a plurality of blades that are disposed in the intermediate space and secured to a connecting element, wherein the connecting element is secured to an outer face of the rotor,
    redirecting a portion of the cooling fluid flowing into the plurality of blades to flow radially outward towards the stator, and
    passing a second portion of the cooling fluid axially through an outlet opening in the connecting element, wherein the outlet opening is disposed radially between the plurality of blades and the rotor and extends axially parallel to a longitudinal axis of the rotor.

10. The method as claimed in claim 9,
    wherein the rotating electrical machine comprises a turbogenerator.

11. The method as claimed in claim 9, further comprising:
    directing the portion of the cooling fluid to a cooling opening located in the stator, and
    passing the portion of the cooling fluid through the stator via the cooling opening.

* * * * *